March 3, 1970    J. R. COYLE    3,497,890
FASTENER AND METHOD OF MAKING THE SAME
Filed Aug. 31, 1967    3 Sheets-Sheet 1
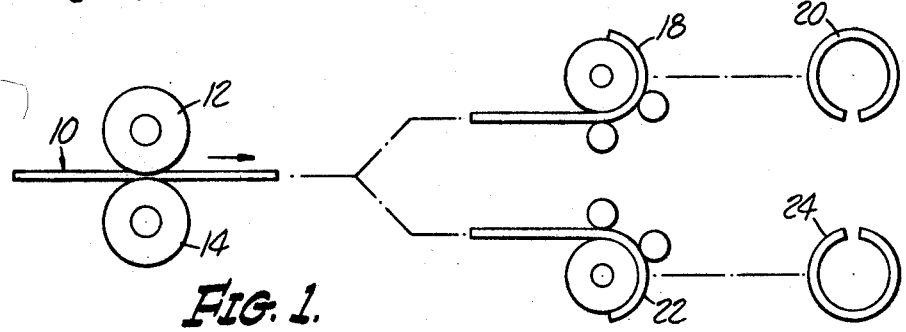
FIG. 1.
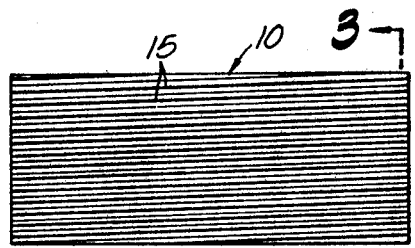
FIG. 2.
FIG. 3.
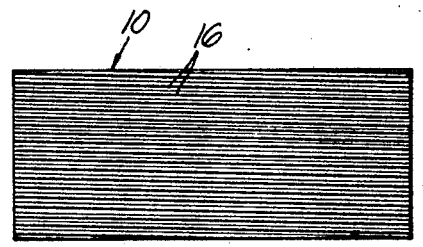
FIG. 4.
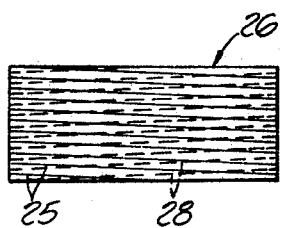
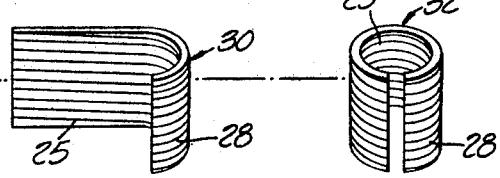
FIG. 5.
FIG. 6.
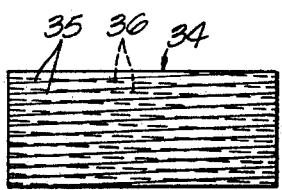
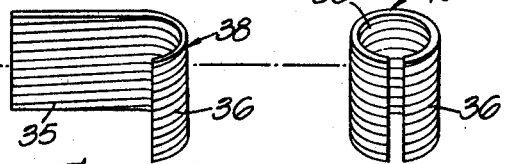
FIG. 32.  FIG. 34.  FIG. 36.
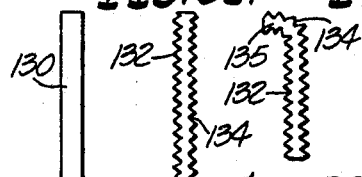
FIG. 31.  FIG. 33.  FIG. 35.
JAN R. COYLE
INVENTOR
BY Paul A. Weilein
ATTORNEY

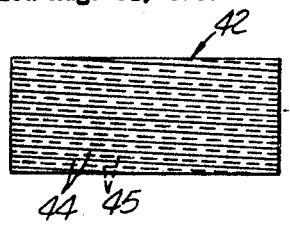
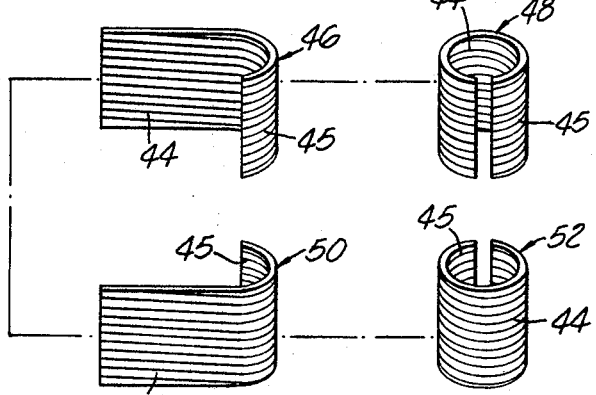
FIG. 7.
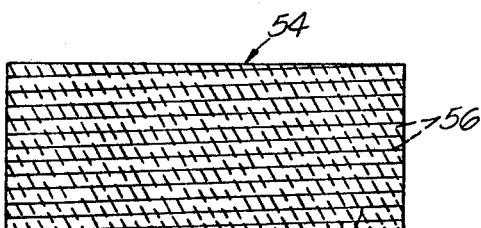
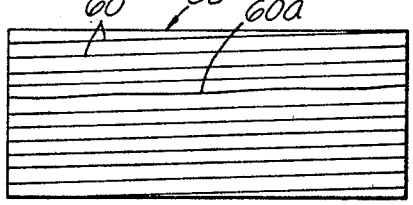
FIG. 8.    FIG. 9.
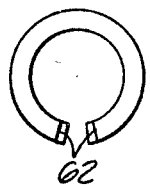 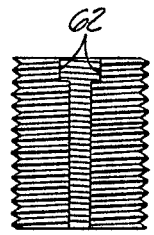 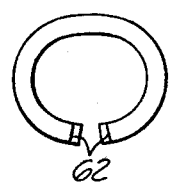
FIG. 10.    FIG. 12.    FIG. 14.
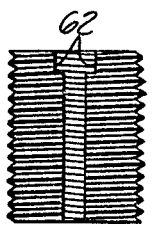 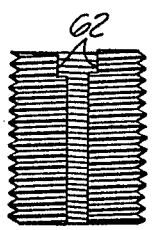 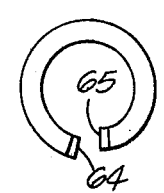
FIG. 11.    FIG. 13.    FIG. 15.
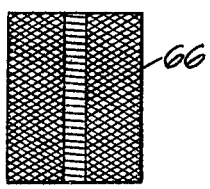
FIG. 16.
JAN R. COYLE
INVENTOR
BY Paul A. Weilein
ATTORNEY March 3, 1970  J. R. COYLE  3,497,890
FASTENER AND METHOD OF MAKING THE SAME
Filed Aug. 31, 1967  3 Sheets-Sheet 3

JAN R. COYLE
INVENTOR

BY
Paul A. Weilein
ATTORNEY

United States Patent Office 3,497,890
Patented Mar. 3, 1970

3,497,890
FASTENER AND METHOD OF MAKING THE SAME
Jan R. Coyle, San Dimas, Calif., assignor to Threadline Fastener Corporation, Covina, Calif., a corporation of California
Filed Aug. 31, 1967, Ser. No. 664,804
Int. Cl. F16b 37/12, 39/284; B21d 53/24
U.S. Cl. 10—86    11 Claims

ABSTRACT OF THE DISCLOSURE

A strip of sheet material is embossed with ribs of the character of screw threads on both of its faces and then the strip is rolled to form a longitudinally split tubular insert for use to retain a screw member in a threaded bore of a workpiece. Self-locking action may be accomplished in various ways as follows: the insert may be noncircular for binding action on the walls of the bore; one of the two confronting ends of the tubular insert may be offset inwardly to resist relative rotation between the insert and the enclosed screw member; one of the confronting ends of the tubular insert may be offset outwardly to resist relative rotation between the insert member and the bore in which it is mounted; the tubular insert may be distorted slightly vertically for misalignment of the turns of either or both the internal and external screw threads at the confronting edges of the split insert; with the insert of normal configuration, one of the internal and external screw threads may be positioned for misalignment at the longitudinal split of the insert; with the turns of a screw thread of the insert misaligned at the confronting edges of the insert, at least a portion of the longitudinal split of the insert may be inclined relative to the axis of the insert in a direction for interference between the confronting edges when restoring the alignment tends to move the confronting edges relative to each other, the result being a self-locking action; and, with the turns of one of the screw threads misaligned at the longitudinal split of the insert the confronting edges of the insert along the longitudinal split may be shaped and dimensioned to interlock to oppose the relative longitudinal movement of the two edges that is required for alignment of the misaligned turns thereby to provide self-locking action when the insert is placed into service.

BACKGROUND OF THE INVENTION

For the purpose of mounting a screw member in a workpiece of relatively soft material such as aluminum, it is common practice to form a threaded bore in the workpiece and to employ a tubular insert having an external thread to permit the insert to be screwed into the threaded bore, the tubular insert being further formed with an internal screw thread to engage the screw member. Conventional inserts have certain disadvantages.

One disadvantage of a conventional tubular insert is that relatively expensive machining operations are required for its manufacture. Another disadvantage is that in practice accurate cross-sectional accuracy is not commercially obtainable in thin walled tubular inserts. Another disadvantage is that greater strength in an insert is desirable than can be provided in a machined tubular insert. Still another disadvantage is that it is too difficult to machine certain exotic materials that have properties that are highly desirable for an insert. A further disadvantage is that it is not practical to attempt to machine a conventional insert to form certain desirable screw thread configurations that differ from conventional screw thread configurations. A still further disadvantage is that it may be too difficult to remove an installed tubular insert. Finally, a disadvantage of certain conventional inserts is that it is necessary to use a special tool for the purpose of distorting the insert into locking engagement with the bore in the workpiece in which the insert is mounted. The need is for simpler methods of interlocking a tubular insert with a threaded bore in which the tubular insert is mounted and for interlocking the insert with a screw member therein.

The object of the present invention is to eliminate these various disadvantages in conventional tubular inserts.

SUMMARY OF THE INVENTION

A rectangular metal strip of a width equal to the desired axial dimension of a tubular insert and of a length approximately equal to the desired circumference of the tubular insert, or slightly less than the desired circumference, is embossed to form a series of substantially parallel ridges on one of its two faces and preferably a second series of parallel ridges on its second face and then the strip is rolled lengthwise to form a tubular insert with a longitudinal split formed by confronting ends of the strip. The two series of ridges form external and internal screw threads, respectively, in the finished insert.

The embossing step may be carried out either by employing roll type die means or by employing coining die means. The two sets of ridges embossed on the opposite faces of the flat strip may be inclined to form four different combinations of screw threads, namely, a right hand external screw thread combined with a right hand internal screw thread, a right hand external screw thread combined with a left hand internal screw thread, a left hand external screw thread combined with a left hand internal screw thread, and a left hand external screw thread combined with a right hand internal screw thread.

One important advantage of the described method of fabrication is that it is less expensive to emboss and roll a strip of metal than it is to machine a tubular insert internally and externally. Another advantage is that the embossing strip makes it possible to achieve a high degree of cross sectional accuracy that cannot be attained by machining a tubular insert. Still another important advantage is that surface formations including screw thread configurations may be embossed in a flat sheet that cannot be formed by machining a tubular body.

A further important advantage is that an embossing technique affords closer control over the dimensions of the insert and especially the wall thickness, and a related advantage is that the embossing technique makes it possible to fabricate an insert with an exceedingly thin wall at relatively low cost, for example, a wall thickness of only a few thousands of an inch.

Another advantage is that it is relatively simple to emboss an exotic metal, for example, A286 Stainless Steel that would be very difficult to machine.

Certain other advantages are inherent in the split configuration of the insert. One advantage is that the insert may be fabricated with liberal dimensional tolerances because of the capability of the insert for contraction and expansion. Another advantage is that the gap at the longitudinal split of the insert may be utilized by a tool for screwing the insert into a bore or for unscrewing the insert. Still another advantage of the split configuration is that the insert is capable of functioning as a C-shaped spring to exert sustained radially outward pressure against the wall of a bore in which the insert is mounted. A further advantage is that if an insert binds in a threaded bore of a workpiece, the longitudinal gap permits the insert to be relaxed or contracted after the cooperating screw member is removed, easy removal of the insert from the workpiece being thus facilitated. A still further advantage of the split configuration is that it makes possible various kinds of self-locking action as will be made clear.

Self-locking action is provided in various ways in various embodiments of the invention. In one embodiment the self-locking action is provided by the split insert acting as a C-shaped spring. In another embodiment at least one of the ridges of at least one of the two series of ridges departs from the conventional screw thread configuration to provide a locking action by interference between two cooperating screw threads. For example, one or two turns of the external screw thread may depart from conventional configuration to provide locking action betwen the insert and the threaded bore in which the insert is mounted. In still another embodiment of the invention self-locking action is provided by offsetting either inwardly or outwardly one of the two confronting edges of the insert. Thus, one of the two confronting edges may be offset outwardly for locking cooperation with the bore in which the insert is mounted and the other of the two confronting edges may be offset inwardly for locking action on the screw member that is mounted in the insert.

In some embodiments of the invention self-locking action is provided by misalignment of the turns of the screw threads at the confronting edges of the insert. For this purpose the turns of one or both of the internal and external screw threads may be shaped for misalignment at the longitudinal split of the insert or the tubular insert may be slightly distorted helically to cause misalignment of confronting ends of screw threads at the longitudinal split. In some embodiments of the invention where the turns of the screw thread are misaligned along the longitudinal split for self-locking effect, the longitudinal split is tapered and is at an acute angle relative to the longitudinal axis of the insert to cause cam action between the two confronting longitudinal edges, the cam action opposing restoration of the alignment of the turns of the screw thread. In one embodiment of the invention where turns of the screw thread are misaligned at the longitudinal split, the confronting longitudinal edges are shaped and dimensioned to interlock to oppose the relative longitudinal movement between the two edges that is involved in restoring alignment of the misaligned turns, the opposition to relative longitudinal movement enhancing the self-locking effect.

An additional feature of the invention is that the embossed strip may be rolled around a member in the course of fabricating the tubular insert to result in an interlocking relation with the member. In this manner the member may be positively engaged by the insert in either a fixed relationship or with freedom for relative rotation between the member and the insert. For this purpose a projection on one of the member and the insert mates with a recess in the other of the member and the insert to provide locking action by mutually engaging shoulders.

The various features and advantages of the invention may be understood from the following detailed description together with the accompanying drawings.

BRIEF DESCRIPTION OF THE DRAWINGS

In the drawings, which are to be regarded as merely illustrative:

FIG. 1 is a diagram illustrating the steps of a preferred method of fabricating the tubular insert wherein a flat strip of metal is first embossed and then rolled to tubular configuration;

FIG. 2 is a plan view of one of the embossed faces of the strip;

FIG. 3 is a transverse section along the line 3—3 of FIG. 2;

FIG. 4 is a plan view of the second embossed face of the strip;

FIG. 6 is a diagrammatic view illustrating the fabrication of a tubular insert having an external left hand thread and an internal right hand thread;

FIG. 6 is a similar diagrammatic view illustrating the steps for producing a tubular insert having an external right hand thread and an internal left hand thread;

FIG. 7 is a similar diagrammatic view showing how an insert may be produced with either a right hand external thread in combination with a right hand internal thread or with an external left hand thread in combination with an internal left hand thread;

FIG. 8 is a plan view of an embossed strip indicating how the series of ridges on the opposite faces of the strip may be at large angles relative to each other;

FIG. 9 is a plan view of an embossed strip showing how one of the ridges that subsequently forms a screw thread may be of irregular configuration to produce a self-locking action;

FIG. 10 is an end view of a tubular insert showing how the tubular insert may be of accurate concentric relationship and also showing how notches may be provided in the confronting edges of the insert at one end of the insert for cooperation with a tool for rotating the insert;

FIG. 11 is an elevational view of an insert that may function as a C-shaped spring;

FIG. 12 is an elevational view of an insert in which the turns of the external screw thread are misaligned at the confronting edges of the insert;

FIG. 13 is an elevational view of an insert that is distorted slightly helically to cause misalignment of the turns of the screw thread at the longitudinal split of the insert;

FIG. 14 is an end elevation of a split insert showing how the split insert may be of elliptical cross sectional configuration;

FIG. 15 is a view similar to FIG. 10 showing how one of the two confronting edges of the split insert may be offset inwardly and the other of the two confronting edges may be offset outwardly for self-locking effects;

FIG. 16 is a side elevational view of an insert that is knurled on its outer circumferential surface for engagement with a bore of a workpiece;

FIGS. 31, 32, and 33 are sectional views illustrating a series of steps for forming the insert shown in FIG. 29; and FIGS. 34, 35, and 36 are similar views illustrating a series of steps for forming the insert shown in FIG. 30.

DESCRIPTION OF SELECTED EMBODIMENTS

Figure 17:
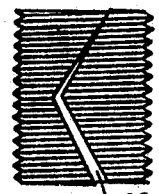
FIG. 17 is an elevational view of an insert in which the external threads are misaligned at the longitudinal split of the insert and in which the longitudinal split is of tapered angular configuration to provide a cam action that enhances the self-locking effect.

FIG. 1 illustrates diagrammatically the steps in the presently preferred method of fabricating a tubular insert of the character described. A flat strip of sheet metal 10 of rectangular configuration has a width dimension approximating the desired axial dimension of the tubular insert and has a length dimension approximately equal to the desired circumference of the insert or slightly less than that circumference. The strip of metal 10 is passed between two embossing rolls 12 and 14 which are under sufficient pressure to effectively imprint the metal.

FIG. 2 shows how one of the embossing rolls forms a series of closely spaced parallel ridges 15 on one face of the strip and FIG. 4 shows how the other embossing roll forms a similar series of ridges 16 on the other face of the strip, the embossed strip having the transverse cross sectional configuration shown in FIG. 3. As indicated at 18, the embossed strip may be rolled lengthwise in one rotary direction to produce a completed insert 20 and as indicated at 22 the strip may be rolled or curled lengthwise in the opposite rotary direction to produce an insert 24.

A tubular insert that is produced in the described manner may have four different combinations of external and internal screw threads, namely: an external right hand thread in combination with an internal right hand thread; an external right hand thread in combination with an internal left hand thread; an external left hand thread in combination with an internal left hand thread; and an external left hand thread in combination with an internal right hand thread. FIGS. 5, 6, and 7 show how these various combinations may be produced by the steps illustrated in FIG. 1.

In FIG. 5 the solid lines 25 indicate the inclination of the embossed ridges on the near face of an embossed blank 26 and the dotted lines 28 indicate the inclination of the embossed ridges on the far face of the strip. In FIG. 5 the strip is rolled lengthwise in one rotary direction as indicated at 30 to produce an insert 32 having the combination of an external left hand thread and an internal right hand thread, the ridges 28 being on the outside of the insert. It so happens that if the embossed blank is rolled or curled in the opposite rotary direction the same combination would be produced but the ridges 25 would be on the outside of the insert.

FIG. 6 shows an embossed blank 34 which differs from the embossed blank 26 in that the ridges incline upwardly towards the opposite ends of the blank. Thus, the ridges 35 on the near face of the blank 34 incline upwardly towards the right end of the blank instead of towards the left end of the balnk and the ridges 36 on the far side of the blank incline upwardly towards the left end of the blank instead of towards the right end of the blank.

The blank 34 is curled in one rotary direction as indicated at 38 to result in a finished insert 40. The insert 40 has an external right hand thread in combination with an internal left hand thread with the ridges 36 on the outside of the insert. Here again, the same combination would be obtained if the embossed blank were rolled or curled in the opposite rotary direction but the ridges 35 would be on the outside.

FIG. 7 shows an embossed blank 42 having closely spaced parallel ridges 44 on its near face and similar ridges 45 on its far face. It will be noted that both sets of ridges incline upwardly towards the same end of the blank which in this instance is the left end of the blank. When the embossed blank 42 is curled or rolled in one direction as indicated at 46 to produce an insert 48, the resulting insert has an external right hand thread in combination with an internal right hand thread. On the other hand, if the blank 42 is curled or rolled in the opposite rotary direction as indicated at 50, the resulting insert 52 has the combination of a left hand external thread and a left hand internal thread. Thus, FIGS. 5, 6, and 7 illustrate how all four of the possible combinations of external and internal screw threads may be produced.

FIG. 8 shows an embossed blank 54 having on its near face ridges 55 and having on its far face ridges 56. It is to be noted that the ridges 56, which may be on the inner circumference of the completed insert, are at a large scale relative to the ridges 56, the angle being approximately 90°. The described method of embossing the screw threads makes it possible to produce such an insert as easily as a conventional insert, but it may be readily appreciated that it would be difficult to machine a conventional tubular insert to produce the same result, the cost being prohibitive for commercial practice.

FIG. 9 shows an embossed blank 58 having the usual series of inclined ridges 60 which become screw threads when the blank is curled or rolled lengthwise to tubular configuration. In FIG. 9 one of the ridges 60a departs slightly from correct alignment realtive to the other ridges. In this instance the ridge 60a is slightly wavy for at least a portion of its length. If the ridges 60 form the external screw thread of the insert, interference will be created between the screw thread 60a and the screw thread of the bore of the workpiece in which the insert is mounted. On the other hand, if the thread 60a is an internal thread, the interference will be created between the thread of the insert and a bolt or screw that is threaded into the insert.

FIGS. 10 and 11 show how a tubular insert may be formed of circular cross sectional configuration with a substantially longitudinal gap between its confronting edges. The two figures also illustrate the fact that at least one of the two confronting edges may be formed with a notch 62 at its outer end. In this instance both edges are formed with notches 62. If the abutting edges are spaced apart as shown in FIG. 11, the insert may be rotated by employing a suitable tool in the gap between the confronting edges. If, however, the confronting edges are in close abutment the provision of a notch 62 or of two notches makes it possible to use a tool in the notch or notches to rotate the insert for the purpose of installing the insert in the threaded bore of a workpiece or for the purpose of unscrewing the insert from the threaded bore. FIG. 14 shows how the insert may be rolled to elliptical cross sectional configuration.

It is apparent that either an insert of circular configuration as shown in FIG. 10 or an insert of elliptical configuration as shown in FIG. 14 as well as an insert of any other non-circular configuration may function as a C-shaped spring for a self-locking action. Thus, the outside diameter of the insert of circular cross section shown in FIGS. 10 and 11 may be slightly larger than the inside diameter of the threaded bore in which it is to be mounted and the major diameter of the elliptical insert shown in FIG. 14 may be slightly larger than the diameter of the threaded bore.

One feature of the invention is the concept of having the turns of a screw thread misaligned at the longitudinal split or gap of the insert. Thus, the turns of the external screw thread may be misaligned for self-locking action between the insert and the bore in which it is mounted or the turns of the internal screw thread may be misaligned for self-locking action between the insert and a screw member that is installed in the insert.

FIG. 12 shows by way of example how the turns of the external screw thread of an insert may be misaligned at the longitudinal split. One procedure for obtaining the misalignment shown in FIG. 12 is to employ a pitch that does not match the outside diameter of the insert. For example, if the outside diameter of the insert is 3/8 inch, the pitch of the embossed ridges in the side of the blank that becomes the outside of the insert may be designed for an insert of slightly less than 3/8 inch outside diameter, for example an insert of 5/16 inch outside diameter. When such a blank is rolled to tubular form the screw threads will be out of alignment at the gap.

When the misaligned turns of a screw thread are engaged by a complementary screw thread of a bore in a workpiece, the mating of the threads tends to shift the two confronting edges at the split of the insert in opposite longitudinal directions. In other words, the mating of the screw threads tends to distort the insert to a slightly helical configuration and the resistance to such distortion results in an effective self-locking action.

FIG. 13 shows how misalignment of an insert may be produced in another manner. The insert shown in FIG. 13 is produced by slightly distorting an insert. Thus, if the insert shown in FIG. 11 is slightly distorted beyond its elastic limits by forcing the two confronting edges in opposite longitudinal directions, the result will be a slightly helical configuration with corresponding misalignment of the threads at the longitudinal split. When the split turns of the threads are mated with a complementary thread the mating of the threads will tend to restore the insert to a normal configuration with resulting resistance for the desired self-locking effect.

FIG. 15 illustrates the fact that one or both of the confronting ends of a split insert may be offset either radially inwardly or radially outwardly. In FIG. 15 one of the confronting edges has a radial outward offset 64 which tends to dig into the metal when the insert is rotated counterclockwise relative to the bore in which it is placed. Thus, if the insert has a right hand external screw thread, the offset 64 will not materially interfere with screwing of the insert into a threaded bore, but once the insert is installed in the bore the offset 64 will dig into the metal of the bore if an attempt is made to unscrew the insert from the bore.

In FIG. 15 the other confronting end of the split tubular insert is formed with a radial inward offset 65 which would tend to dig into the metal of a screw member in the insert if the screw member were rotated counterclockwise relative to the insert. Thus, the offset 65 would readily permit a screw member to be threaded into the insert but would resist any tendency for loosening rotation of the installed screw member.

FIG. 16 shows a split tubular insert in which knurling 66 instead of ridges is embossed in the external surface of the insert. It is contemplated that the insert shown in FIG. 16 would be slightly oversized for the previously mentioned function of the insert as a C-spring. The knurled insert may be employed effectively in an internally threaded bore and may also be employed effectively in a smooth bore of a workpiece and especially so if the material of the workpiece is relatively soft.

The insert shown in FIG. 17 has an angular longitudinal split 68 which tapers to bring the confronting edges into abutment at the upper end of the insert. With the turns of the outside screw thread misaligned at the gap between the two confronting edges of the insert, screwing the insert into a threaded bore of a workpiece will tend to bring the misaligned turns into alignment with each other with consequent upward shift of the angular edge on the right side of the split and downward shift of the angular edge on the left side of the split. Thus, screwing the insert into a threaded bore tends to distort the insert and the resistance to such distortion provides a self-locking action. It is to be noted that the cam action at the upper end of the insert involves radial expansion of the insert and, therefore, the insert may be designed for a snug fit in a threaded bore with the cam action serving to increase the tightness of the fit for a self-locking action.

In an alternate construction the turns of the screw thread of the insert shown in FIG. 17 are in alignment at the angular split but the insert is oversized relative to the threaded bore in which it is to be installed. Screwing the oversized insert into the threaded bore causes the insert to contract with the consequence that the confronting inclined edges at the upper end of the insert will slide relative to each other with a camming action that will tend to distort the insert to slightly helical configuration with consequent self-locking action.

Figure 18:
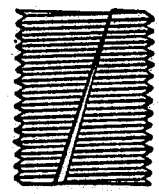
FIG. 18 is an elevational view of an insert in which the external screw threads are misaligned at the longitudinal split and in which the longitudinal split is tapered and is at an acute angle relative to the longitudinal axis of the insert to produce a cam action for enhancing the self-locking effect.

FIG. 18 shows an insert that is identical with the insert shown in FIG. 17 except that the longitudinal split is not angular. It is to be noted that the split tapers with the confronting edges in abutment at the upper end of the insert. It is apparent that the insert shown in FIG. 18 may have the various functions discussed with reference to FIG. 17.

Figure 19:
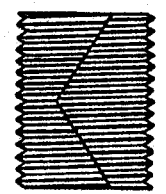
FIG. 19 is an elevational view of an insert with the external screw threads misaligned at the longitudinal split of the insert and with the confronting edges of the insert shaped and dimensioned to interlock for resistance to relative longitudinal movement between the two edges for the purpose of enhancing the self-locking effect.

In FIG. 19 the insert has an angular split without the split being tapered. Although FIG. 19 shows an appreciable gap at the angular split, the insert is preferably dimensioned for the gap to be closed when the insert is installed in a threaded bore. With the gap closed it is apparent that the confronting edges of the insert interlock to oppose relative movement between the confronting edges longitudinally of the insert. With the turns of the screw thread on the opposite sides of the angular split misaligned relative to each other, screwing the insert into a threaded bore tends to bring the misaligned threads into alignment with each other with consequent relative movement between the two confronting edges of the insert. The relative movement in either direction results in a cam action between the inclined portions of the confronting edges with two results, namely, resistance to screwing of the insert into the threaded bore for a self-locking action and radial expansion of the insert to tighten the insert in the bore. The radial expansion will occur at one end or the other depending upon the direction of the relative movement that is involved in the aligning of the misaligned turns of the screw thread.

Figure 20:
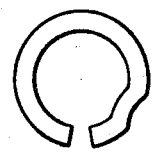
FIG. 20 is an end elevational view of an insert showing one form of non-circular cross sectional configuration that may be utilized for a self-locking effect.

FIG. 20 shows how a longitudinally split insert of the character described may be radially inwardly indented to make at least a portion of the insert out of round for self-locking action on any screw that may be threaded into the insert. It is to be noted in FIG. 20 that the indentation is close to the longitudinal split of the insert and the self-locking action has a tendency to narrow the gap at the longitudinal split.

Figure 21:
FIG. 21 is a similar view showing another non-circular cross sectional configuration that may be used for a self-locking effect.

FIG. 21 shows in cross section how an insert may be formed out of round with portions of the insert offset radially outwardly and other portions offset radially inwardly. Thus, the insert shown in FIG. 21 will have a self-locking action with respect to the threaded bore in which it is installed and will also provide a self-locking action with respect to any screw member that may be threaded into the insert.

Figure 22:
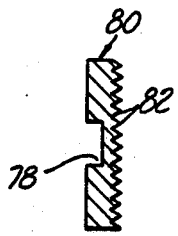
FIG. 22 is a transverse cross section of a flat embossed strip employed in one practice of the invention.
Figure 23:
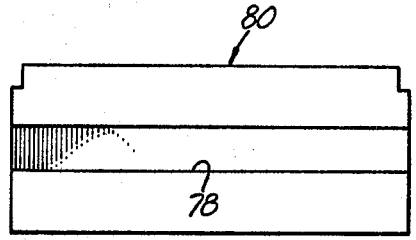
FIG. 23 is a face view of the same strip.
Figure 24:
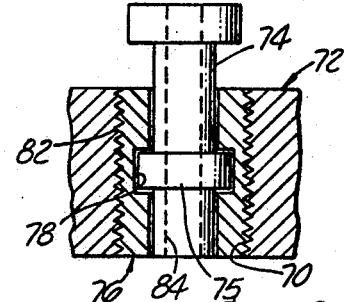
FIG. 24 is a sectional view showing the strip of FIGS. 22 and 23 wrapped around a member in interlocking engagement with the member for the purpose of installing the member in a threaded bore of a workpiece.

FIGS. 22, 23, and 24 show how an insert may be employed in a threaded bore 70 of a workpiece 72 to interlock a member 74 with the workpiece. In this instance the member 74 has a circumferential rib 75 and the insert 76 is formed with an inner circumferential groove 78 for interlocking engagement with the circumferential rib. FIG. 22 shows the cross sectional configuration of an embossed blank 80 that is rolled or curled to form the insert 76. The embossed blank 80 is formed with the previously mentioned groove 78, th groove extending longitudinally of the blank. The opposite face of the blank 80 is formed with closely spaced ridges 82 which become the turns of the external screw thread of the insert.

When the blank 80 is rolled or curled to tubular configuration to form the insert 76, the insert is wrapped around the member 74 for permanently interlocking the member and the insert. If desired, the member 74 may fit in the insert with sufficient looseness to permit free rotation of the member relative to the insert. The member 74 may be formed with an axial passage 84 where fluid communication is required through the workpiece 72.

Figure 25:
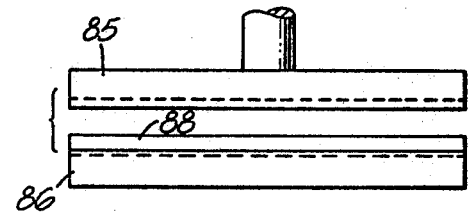
FIG. 25 is a simplified side elevational view of coining dies that may be employed to emboss a flat strip.

FIG. 25 shows an upper coining die 85 and a lower coining die 86 that may be employed to emboss a metal strip. A metal strip 88 that is to embossed is placed on the lower die 86 as shown and then the two dies are closed under high pressure to carry out the embossing step.

Figure 26:
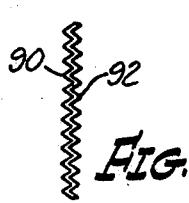
FIG. 26 is a radial section of a tubular insert having an extremely thin wall.

FIG. 26 shows how an exceedingly thin walled embossed insert may have external and internal threads of the same pitch, the screw thread 90 being the external screw thread and the screw thread 92 being the internal screw thread. It is to be noted that the valleys of each screw thread register with the crests of the other screw thread, and that the wall of the insert is so thin that each of the two screw threads extends into the radial zone of the other screw thread. The strip of metal for fabricating such an insert may be of a given thickness in the flat and may be of the same thickness after it is embossed. In other words, the embossing may simply give the sheet metal a wavy cross sectional configuration without appreciably affecting the thickness of the sheet metal.

An outstanding advantage of an insert constructed as indicated in FIG. 26 is the exceedingly small amount of metal that is required to provide both an external and an internal screw thread. When external and internal screw threads of an insert are machined it is always necessary to provide a liberal thickness of metal because otherwise the cutting of a screw thread may result in cutting through the metal. Since an insert of the construction indicated by FIG. 26 is of a minimum weight, the insert has special utility where weight is a primary consideration. It is also to be noted that while it is a simple matter to form such an insert by embossing a metal strip, it would be exceedingly difficult to attempt to machine such an insert of uniform thickness.

Figure 27:
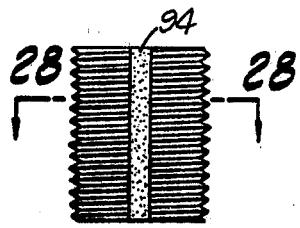
FIG. 27 is an elevational view of a longitudinally split insert with plastic material bridging the split.
Figure 28:
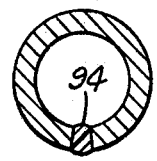
FIG. 28 is an end view of the same insert.

FIGS. 27 and 28 illustrate the fact that where a gap that is provided by a longitudinal split insert is undesirable, for example where such a gap may cause leakage of a fluid along the length of the insert, the gap may be bridged and closed by a longitudinal plastic strip 94. The plastic strip may be formed by brushing an uncured viscous plastic across the gap or may be formed by interposing a plastic strip and bonding the plastic strip to the two confronting edges of the insert. Preferably, the plastic strip 94 bulges both radially inwardly and radially outwardly as shown in FIG. 28 to create a self-locking action by interference with a complemental external screw thread and by interference with a complemental internal screw thread.

Figure 29:
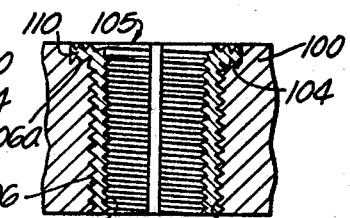
FIG. 29 is a sectional view showing one form of flanged insert in a threaded bore of a workpiece.

FIG. 29 shows a workpiece 100 formed with a threaded bore 102 and further formed with a counterbore 104. An insert generally designated 105 is formed with an external embossed thread 106 to engage the screw thread of the bore in the workpiece and is further formed with the usual internal screw thread 108 to engage a screw member in the usual manner. A feature of the insert 105 is that it is formed with a radial flange 110 to seat in the counterbore 104 and a further feature is that the turns of the external screw thread 106 are continued on the underside of the flange as indicated at 106a. The threads 106a on the underside of the flange 110 engage and may appreciably penetrate the surface of the counterbore 104 for a useful self-locking action.

Figure 30:
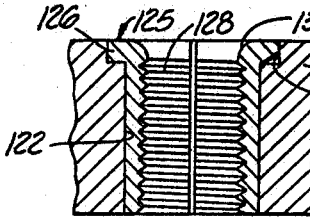
FIG. 30 is a similar view showing another form of flanged insert.

FIG. 30 shows a workpiece 120 with a smooth bore 122 and a smooth counterbore 124. An insert generally designated 125 is formed with a radial flange 126 and has the usual internal screw thread 128. The inner circumferential surface of the insert forms a flared entrance 130 to facilitate the screwing of a screw member into the insert. The outer circumferential surface of the insert is smooth. The insert is mounted in the bore 122 with a forced fit, the insert acting as a C-shaped spring for retention in the bore.

It is to be noted that in both FIGS. 29 and 30 the radial flange of the insert seats in the counterbore with the counterbore serving as a stop to limit axial movement of the insert inwardly of the bore. Thus, when a screw member is threaded into such a flanged insert the flange of the insert resists the tendency of the insert to move axially in response to the thrust of the screw member.

FIGS. 31, 32, and 33 illustrate the steps of a method of fabricating the insert 105 shown in FIG. 29. FIG. 31 shows in cross section a blank 130 and FIG. 32 shows how the blank may be embossed to form a first series of closely spaced parallel ridges 132 on one face of the blank and a similar series of closely spaced ridges 134 on the other face of the blank. After the blank is embossed as indicated in FIG. 32, the blank is flanged to produce a flange 135 along one longitudinal edge of the flange. It is to be noted that the longitudinal flanging of the blank results in some of the ridges 132 extending to the underside of the flange 135 and further results in some of the ridges 134 extending over the outer side of the flange. The flanged embossed blank shown in FIG. 33 is then rolled or otherwise formed to the final tubular configuration of the insert shown in FIG. 29.

FIGS. 34, 35, and 36 illustrate successive steps that may be employed in the fabrication of the flanged insert 125 shown in FIG. 30. FIG. 34 shows in cross section a blank 140 and FIG. 35 shows how the plain blank 140 may be formed with a longitudinal flange 142 along one of its side edges. The next step illustrated by FIG. 36 is to emboss one face of the blank to produce ribs 128 which subsequently form the internal screw thread 128 of the insert 125. After the blank is longitudinally flanged and embossed on one face as shown in FIG. 36, the blank is rolled or otherwise formed to the tubular configuration of the insert 125 in FIG. 30.

My description in specific detail of the selected embodiments of the invention will suggest various changes, substitutions, and other departures from my disclosure within the spirit and scope of the appended claims.

What is claimed is:

1. A method of fabricating a tubular insert of the character described for installation in a bore of a workpiece, including the steps of:

embossing a series of closely spaced substantially parallel ridges of the cross sectional configuration of a screw thread on at least one face of a strip of sheet material with the strip of a length at least approximately the desired circumferential dimension of the insert; and forming the embossed strip lengthwise to a generally cylindrical but out-of-round configuration to form a tubular insert of longitudinally split configuration for locking action with the bore and with said ridges forming turns of a screw thread inside the insert.

2. A method as set forth in claim 1 in which the strip is formed to elliptical configuration for locking action in the bore of the workpiece.

3. A method of fabricating a tubular insert of the character described for installation in a bore of a workpiece, including the steps of:

embossing a series of closely spaced substantially parallel ridges of the cross sectional configuration of a screw thread on one face of a strip of sheet material with the strip of a length at least approximately the desired circumferential dimension of the insert;

embossing a series of similar closely spaced substantially parallel ridges on the other face of the strip; and forming the embossed strip lengthwise to generally cylindrical configuration to form a tubular insert of longitudinally split configuration with ridges forming both interior and exterior screw threads.

4. A method as set forth in claim 3 in which the series of ridges incline upwardly towards one end of the strip on one face of the strip and incline upwardly on the other face of the strip towards the other end of the strip to result in screw threads of opposite hands on the exterior and interior, respectively, of the insert.

5. A method as set forth in claim 3 in which the ridges on both faces of the strip incline upwardly towards the same end of the strip to result in screw threads of the same hand on the interior and exterior of the insert.

6. A method as set forth in claim 3 which includes the step of offsetting one end of the rolled strip slightly inwardly to engage the exterior of any screw member that may be threaded into the insert.

7. A method as set forth in claim 3 which includes the step of offsetting one of the confronting ends of the insert slightly radially outwardly to engage the workpiece in which the insert is installed.

8. A method as set forth in claim 7 which includes the step of offsetting the end of the other of the two confronting ends of the longitudinally split insert slightly radially inwardly, the two offset end portions being oriented to resist loosening rotation of the insert in the workpiece and to resist loosening rotation of any screw member that may be threaded into the insert.

9. A method as set forth in claim 3 in which the step of forming the strip into a tubular insert is carried out to make the insert non-circular in cross sectional configuration for locking effect in the bore in which the insert is mounted.

10. A method as set forth in claim 9 in which the step of forming the strip to tubular configuration is carried out to make the insert of elliptical cross section for locking action in the bore in which the insert is mounted.

11. A method as set forth in claim 4 in which the strip of sheet material is relatively thin, in which the inclination and spacing of the two series of grooves are the same and in which the valleys or grooves formed by each series of ridges register with the crests of the other series of ridges.

References Cited

UNITED STATES PATENTS

| | | | |
|---|---|---|---|
| 2,137,797 | 11/1938 | Berger | 29—415 |
| 2,157,354 | 5/1939 | Sherman. | |
| 2,165,007 | 7/1939 | Rosenberg. | |
| 2,592,129 | 4/1952 | Engstrom. | |
| 2,796,107 | 6/1957 | Schwaiger. | |
| 2,956,293 | 10/1960 | McKay et al. | |
| 3,029,856 | 4/1962 | Abbott. | |
| 3,163,196 | 12/1964 | Hanneman | 10—10 X |
| 3,324,920 | 6/1967 | Brown. | |
| 3,391,721 | 7/1968 | Rosan | 151—22 X |

FOREIGN PATENTS

| | | |
|---|---|---|
| 1,045,972 | 7/1953 | France. |
| 1,048,381 | 11/1966 | Great Britain. |

MILTON S. MEHR, Primary Examiner

U.S. Cl. X.R.

29—415; 72—168, 197, 366

UNITED STATES PATENT OFFICE
CERTIFICATE OF CORRECTION

Patent No. 3,497,890         Dated   March 3, 1970

Inventor(s)  Jan R. Coyle

It is certified that error appears in the above-identified patent and that said Letters Patent are hereby corrected as shown below:

Column 3, line 72, "FIG. 6" should read --FIG. 5--.
Column 6, line 18, "scale" should read --angle--.
Column 9, line 11, before "embossed" insert --be--.

SIGNED AND
SEALED
AUG 18 1970

(SEAL)
Attest:

Edward M. Fletcher, Jr.
Attesting Officer

WILLIAM E. SCHUYLER, JR.
Commissioner of Patents